United States Patent [19]

Kozlowski et al.

[11] 4,091,868
[45] May 30, 1978

[54] METHOD OF TREATING OIL WELLS

[75] Inventors: Eugene C. Kozlowski, Anaheim; Charles A. Stout, Tustin, both of Calif.

[73] Assignee: Diversified Chemical Corporation, Stanton, Calif.

[21] Appl. No.: 775,332

[22] Filed: Mar. 7, 1977

[51] Int. Cl.² .......................................... E21B 33/138
[52] U.S. Cl. ................... 166/250; 166/281; 166/295
[58] Field of Search ............... 166/250, 281, 295, 300, 166/305 R

[56] References Cited

U.S. PATENT DOCUMENTS

| | | | |
|---|---|---|---|
| 2,248,028 | 7/1941 | Prutton | 166/295 |
| 2,274,297 | 2/1942 | Irons et al. | 166/295 X |
| 2,556,169 | 6/1951 | Crouch et al. | 166/295 |
| 2,675,881 | 4/1954 | Cardwell | 166/295 |
| 3,161,235 | 12/1964 | Carr | 166/281 |
| 3,176,765 | 4/1965 | Hayford et al. | 166/295 |
| 3,193,011 | 7/1965 | Rickard | 166/295 |
| 3,302,717 | 2/1967 | West et al. | 166/295 X |
| 3,308,884 | 3/1967 | Robichaux | 166/295 |
| 3,431,977 | 3/1969 | East et al. | 166/281 |
| 3,487,877 | 1/1970 | Methven | 166/295 |

OTHER PUBLICATIONS

Ford, Jr. et al., "Field Results of a Short-Setting-Time Polymer Placement Technique," *Journal of Petroleum Technology*, Jul. 1976, pp. 749–756.

*Primary Examiner*—Stephen J. Novosad
*Assistant Examiner*—George A. Suchfield
*Attorney, Agent, or Firm*—Knobbe, Martens, Olson, Hubbard & Bear

[57] ABSTRACT

Processes for plugging oil producing formations, fluid thief formations and the like in oil wells and compositions for the same are disclosed.

20 Claims, 4 Drawing Figures

METHOD OF TREATING OIL WELLS

This invention relates to methods and materials for plugging ruptures or perforations in oil well casings or enlargements or breaks in screen pipes, or the like. More specifically, this invention relates to methods and materials for plugging the sand formation proximate a rupture or perforation in an oil well casing or an enlargement or break in a screen type.

A well-known problem in the production of petroleum from oil wells is the sanding up of the well resulting from a rupture or break in the oil well casing or an enlargement or rupture in the oil well screen pipe resulting in the rapid inflow of large quantities of sand from the surrounding petroleum bearing sand deposit. The next result of this sanding up is temporarily or permanently to take the oil well out of production. One of the features of this invention is that a method and means is provided for repairing the oil well casing or sand screen by insitu formation of a permanent fluid block in the geological formation adjacent the rupture, penetration or break.

A serious problem in the secondary recovery of oil from oil bearing or containing subterranean formations, wherein a fluid is injected into the formation via one or more injection wells to drive the oil through the formation to one or more production wells, is the development of high permeability flow zones, often known as "thief" zones which permit the drive fluid to channel directly from the injection well to the production well. In many instances, the channelling or fingering resulting from the high permeability leaves substantial quantities of oil in the less permeable zones of the formation which are bypassed in the process. One of the features of this invention is that means and methods are providing for blocking off thief zones to thereby permit the forcing of oil from the less permeable zones by the application of fluid pressure directly to such zones, without the loss of fluid and fluid pressure through the adjacent thief zones.

The problems discussed hereinbefore are well known and have been the subject of investigation for many years and many efforts have been made to provide materials and processes for efficient recovery and secondary recovery of oil from petroleum bearing subterranean formations. For example, the injection of a stable foam into a high permeability formation has been proposed, U.S. Pat. No. 3,412,793, Needham, Nov. 26, 1968. Various gels, for example, carboxyalkly cellulose ethers, e.g., carboxyethyl cellulose and carboxymethyl cellulose, (U.S. Pat. No. 3,727,687, Clampitt et al, Apr. 17, 1973), polyacrylamides and polymethacrylamides (U.S. Pat. No. 3,749,172, Hessert et al, July 31, 1973) and various combinations and modifications of these (U.S. Pat. Nos. 3,762,476, Gall, Oct. 2, 1973 and 3,785,473, Clampitt et al, Jan. 15, 1974) have been proposed. Various acrylic resins have also been developed and have attained a degree of success. In general, the teachings of the prior art failed to provide a solution to the problems faced and solved according to this invention in that the materials used do not provide a permanent, certain repair to the casing or screen pipe failure, are difficult to use and are uncertain in result. The present invention provides an improvement in the method and materials for repairing failures in oil well casings and screen pipes and for plugging thief zones.

In very general terms, the present invention comprises the steps of isolating the failure or thief zone to be plugged, establishing rate and pressure data for fluid flow into the area to be plugged, pumping a rate-controlled insitu polymerizing solution into the zone to be plugged, shutting in the zone for a predetermined time to allow insitu polymerization, and, in particular instances, retesting to establish rate and pressure data for the same general zone and repeating until all zones requiring plugging or repair have been plugged.

The method and materials of this invention will become more apparent from the following specification and from the drawings wherein.

Figure 1:
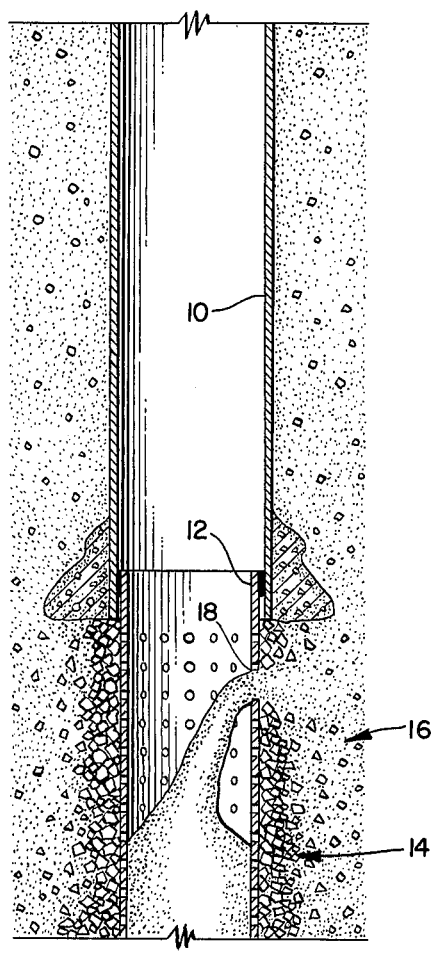
FIG. 1 is a generally schematic view of the bottom portion of an oil well showing the casing and the screen pipe in simplified cross section.

One of the important problems or failures of oil wells for which this invention provides a solution is illustrated in a general schematic manner in FIG. 1 which is a cross sectional view in general schematic form of the bottom of a well casing and the top of a well screen, the casing being shown generally at 10, the screen being shown at 12. This illustration is intended only to depict in a very general way a typical oil well casing and screen construction, no particular structure being contemplated since this invention is of general application. There are, of course, almost innumerable variations in the oil well conduit structures to which this invention is applicable and reference is made to standard textbooks, technical articles and treatises in the field such as, for example, Petroleum Production Engineering, Oil Field Exploitation, L. C. Uren, 3rd Edition, McGraw-Hill Book Company, Inc., 1953, for particular constructions and details of oil well conduit structures. In the typical oil well, a layer of gravel forms, by natural depletion of fines in the sand subterranean structure or by injection of gravel into the oil well, adjacent the oil well screen, as shown generally at 14. Surrounding the gravel structure, which functions as a screen to keep out fine said particles once production is under way, is the oil sand structure indicated generally at 16. One form of the problem for which this invention provides a solution is indicated by the break 18 in the screen pipe. This break may be located in the screen pipe and result from corrosion, damage by tooling in the well, or by a combination of these. The net result being the enlargement of the apertures through the wall or the formation of overly large apertures by anyone or a combination of the foregoing phenomena. Similarly, a like perforation or puncture of the casing wall 10 may result from any combination of these phenonema from joint failure or various other problems which infect the drilling and operation of oil wells generally. While the particular discussion in the following specification is focused most generally upon the repairs of failures in the screen, it will be understood that the same operations, processes and materials may be used in the repair of oil well casings.

Another problem which is solved by the present invention is the well-known thief zone problem. Since this phenomena is well-known and has been discussed at length in petroleum production literature, no extended explanation is appropriate or necessary. Briefly, these thief zones result from the action of injection fluds flowing through the oil production zones or may simply be formed naturally in the vicinity of the oil producing sands. In either case, production is lost simply by the recycling of the injection water through these high permeability thief zones or, in some instances, simply the loss of injection water into non-oil bearing sands or other non-oil bearing formations.

Figure 2:
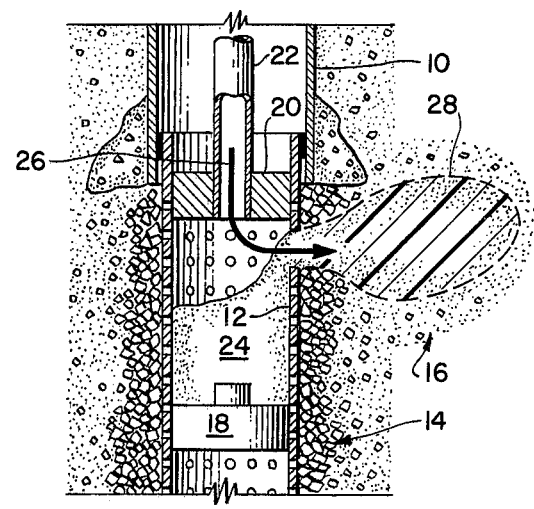
FIG. 2 is a simplified schematic of a section of an oil well showing schematically the operation of the present invention.

A simplified schematic diagram, FIG. 2, illustrates in a general way the action of the present invention in repairing the exemplary problem, a failure of the screen pipe. The first step in the process is to locate the failure. This is generally quite easily done by simply isolating various portions of the casing and screen and measuring the rate of fluid injection take-up. For example, as illustrated in FIG. 2, the failure has been located and isolated by the placement of two plugs, 18 and 20, plug 20 being provided with a conduit connector reaching to the surface indicated generally at 22. In the course of isolating the failure, a layer of sand indicated at 24 will normally build up on the bottom plug 18, thus providing even additional isolation to the zone to be plugged.

The second step is to calculate the volume of the zone indicated by the dashed line 28 in FIG. 2, which is to be plugged. The volume of the plug zone is calculated by pumping water, or any other incompressible liquid such as a water solution of appropriate salt strength, etc., through the failure at a known pressure and flow rate. This establishes the permeability of the plug zone and provides the necessary data for determining how much of the plugging fluid will be required to establish a plug zone of predetermined size.

Next, a plugging material consisting essentially of phenolicparaformaldehyde blended which is soluble in water, polymerizes in situ when catalyzed with sodium silicate incorporating substantially all water in the formation into a gel without substantial weepage and which forms a gel which non-adhesive to silicate, i.e., sand and gravel, is pumped into the formation. Such a composition is sold under the trademark Thief Kill by Diversified Chemicals Corporation, 8100 Electric Avenue, Stanton, California 90680. The plugging material will be referred to hereinafter as Thief Kill merely to exemplify the compositions which may be used as plugging material in accordance with this invention. The plugging composition is pumped into the plug zone at a predetermined rate and pressure to thereby form a polymer filled zone, shown at 28 in FIG. 2, of predetermined volume. The polymer filled zone is then shut in by injecting a predetermined quantity of non-polymer containing water or other fluid to confine the polymer containing zone to the sand structure proximate the break in the screen pipe. The polymer containing zone is maintained in shut-in configuration for a predetermined period of time which will be discussed in detail hereinafter, to permit insitu polymerization to form a solid, totally impermeable, permanent polymer plugged zone which acts as an absolute barrier to the flow of water, oil or other fluids. This polymer plugged zone forms a permanent repair to the aperture through the wall of the screen pipe.

In the simplest form of the invention, the last and final step is simply to check the effectiveness of the repair by pumping water to the repair zone at the predetermined pressure and measuring the rate of take-up. If the repair has been effective, the rate of take-up will be diminished to zero, in the case of the repair of a well casing, or to a very much lower rate corresponding to the normal take-up rate for a screen-gravel-sand permeability zone, in the case of a repaired screen pipe.

It is possible, of course, that there is more than one failure in the isolated zone. In this case, the repair, according to the preceding procedure, may have been effective to repair all of the failures or it may have been effective only to repair one of the failures or only to partially repair all of the failures. In the latter two cases, the take-up at the predetermined pressure will still exceed that which would be normal for the screen-gravel-sand permeability system. If an abnormally high fluid take-up is experienced, then the second, third and fourth steps, pumping the Thief Kill in, shutting in the Thief Kill plug for insitu polymerization, and testing by pumping water to the isolated zone, are repeated again. These steps may be repeated as often as necessary to effect a complete repair of the failure. Once the failure has been completely repaired, the plugs are removed and the well is placed back into production. In the case of repairing a ruptured or fractured well casing, the repair steps are repeated until there is zero take-up of the test fluid.

Figure 3:
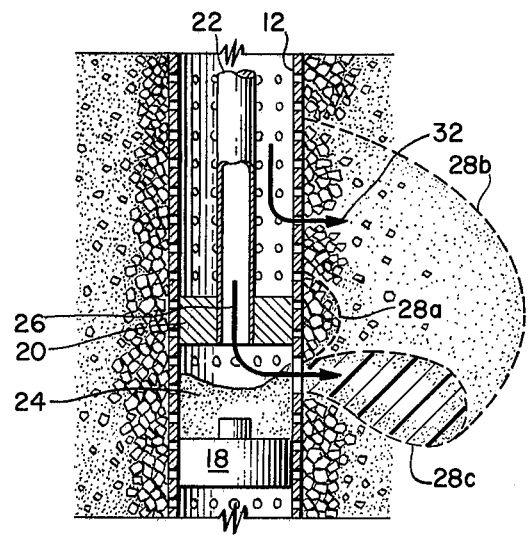
FIG. 3 is a simplified schematic view of a section of the screen pipe of an oil well showing in simplified form the operation of the present invention in an alternative aspect.

If, as illustrated in FIG. 3, the failure occurs a distance down the screen pipe of a producing oil well, the process is modified to prevent unnecessary plugging of the oil producing formation adjacent the upper section of the screen pipe. If the plugging polymer, Thief Kill, were to be pumped as indicated at arrow 26 through the aperture in the screen pipe wall, without precautions being taken to direct the flow of the plugging fluid in the formation, the plugging polymer fluid would tend to flow upwardly to the producing section of the oil well in a zone indicated generally by the dashed lines 28a and 28b in FIG 3. The exact size and shape of the zone depends, of course, upon the relative permeability of the zone, the rate of injection, the rate of take-up in the producing zone, and other factors peculiar to the size, shape and permeability of the oil well to be repaired.

In order to prevent this undesirable result, the process is modified to include additional steps. In this aspect of the process, the first step, again, is to isolate the failure using plugs, 18 and 20, providing a fluid injection conduit 22 through the plug 20.

Once the zone has been isolated, then the flow or take-up capacity of the failure is determined by establishing a known pressure-flow rate relationship in the failure zone. Having established this known pressure-flow rate relationship in the failure zone, then water, or other liquid, is pumped through the annular conduit 30 and into the formation above the repair zone as indicated generally by arrow 32 in FIG. 3 at the same rate as was established for the repair zone. By establishing the same flow rate at the same pressure, the fluid flow pattern is established generally symmetrically outwardly from the screen pipe. Once these flow-pressure rate relationships have been established, then the polymer containing plugging fluid, Thief Kill, is pumped as indicated at arrow 26 through the break in the screen pipe and into the adjacent sand formation. The simultaneous pumping of liquid as indicated at arrow 32 into the formation from the producing portion of the well prevents the return flow of the polymer containing solution, as indicated at lines 28a and 28b, which would otherwise result and defines the area of the plug to a zone generally indicated at 28c in FIG. 3. Thus, there is no tendency of the polymer to plug the producing portion of the formation which need not be plugged in order to accomplish the necessary repair.

Once a predetermined volume of plugging polymer solution has been pumped into the formation, water is pumped in to force any residual polymer out of the oil well conduit proper into the formation and the polymer plug is shut in for a predetermined period of time to permit insitu polymerization to form the solid, impermeable, permanent repair to the failure of the screen pipe.

As in the preceding example of the process, the effectiveness of the repair is tested by pumping water into the repair zone to establish a new pressure-rate value for the zone. If further repair is indicated by the pressure/rate data, then the preceding three steps, pumping Thief Kill into the formation, shutting in the Thief Kill to permit polymerization, and rechecking by pumping water to the repair zone, are repeated. These steps may be repeated as often as is necessary to provide complete repair. In all cases, once the new pressure-flow data have been established for the repair zone, the same pressure-flow characteristics are established into the producing zone, indicated by arrow 32, so as, in each case, to prevent return of the plugging polymer containing solution to the producing zone and, also, to prevent unnecessary distortion of the plug zone.

In the preceding examples of the method of the invention, the example of a failure of the casing or screen pipe wall is discussed as exemplary. In both instances, this type of repair would most commonly be used in a producing oil well to return it to full production following failure of a portion of the conduit wall and sanding up. The same techniques may, however, be used in the case of a failure in the wall of an injection well, although this type of repair is less common.

The methods and materials of this invention find broad application in modifying the flow characteristics of injection wells in that thief zones are permanently and effectively plugged using the methods and materials previously discussed. The method is carried out in essentially the same way. The first step is to locate and isolate the thief zone. This is done in the same way that a failure of the casing or screen pipe is located and isolated, using bridge plugs and determining the pressure-flow rate characteristics of particular sections of the conduit. The isolation of the thief zone is indicated by an extraordinarily high flow rate in the isolated zone. The object of the treatment is to reduce or to eliminate fluid flow into the thief zone. Once the thief zone has been isolated using the bridge plugs, the next step is to establish pressure-flow rate characteristics for the isolated thief zone from which the volume of polymer containing plugging solution required to form a predetermined volume of polymer plug in the formation can be calculated. The next step is to pump the predetermined volume of plugging polymer solution, Thief Kill into the thief zone to plug the formation adjacent the isolated section of the oil well conduit. A predetermined volume of water is then pumped into the isolated section to force the plugging polymer solution out of the conduit per se and into the formation. The polymer plug is then shut in, i.e., pumping is eliminated and a stagnant, stable fluid condition is established in the formation adajacent the oil well conduit, for a predetermined period of time to permit insitu polymerization of the polymer to form a formation bonded together by the polymer, this bonded formation forming a permanent, impermeable plug. Following this repair, a new pressure-flow rate is established to determine the effectiveness of the repair. In the event the repair is not complete, i.e., more than the desired fluid is still flowing into the formation, then the preceding three steps, pumping Thief Kill into the formation, shutting in the Thief Kill to permit polymerization, and retesting by establishing a new pressure-flow rate, is repeated. These steps may be repeated as often as necessary to eliminate the flow into the thief zone entirely or reduce it to a tolerable level, as may be desired in a particular well and formation. The plugs are then removed and injection is resumed in the normal manner.

One of the important features of this invention is that total repair of a failure in the oil well conduit system or total plugging of the thief zone, as may be required in a particular instance, is accomplished and its effectiveness tested in one process. That is, once the repair or thief zone plugging team is on sight, the repair or plugging is completed before the team leaves. This is an extremely important advantage over the prior art processes which often required many days and many interruptions in the normal production of oil and, in many cases, the repair was never complete or satisfactory.

In most cases, the Thief Kill is premixed according to known or predetermined temperature, ionic strength and other known data to polymerize within a predetermined period of time at the formation conditions and is simply pumped into the formation and shut in to permit polymerization. The polymerization may take a few minutes to an hour or two depending upon the heat and salt content of the formation and upon the desires of the repair crew. In some instances, it is desirable to mix the constituents of the plugging polymer solution at the point of injection into the formation, i.e., in the well conduit adjacent the failure or thief zone. Mixing in the oil well conduit at the point of injection is usually necessary only where very deep wells or unusually high temperatures are encountered. In such cases, conventional mixing nozzles as are commonly used in the chemical process industries can conveniently be used. The mixing nozzle is simply connected to the end of a pair of fluid conduits and lowered to the point of injection into the formation. The constituents of the plugging polymer, Thief Kill, are then pumped separately down the conduit, thoroughly mixed in the mixing nozzle and injected by the applied pressure into the formation.

In some instances, it is desirable to load the plugging polymer containing solution, Thief Kill, with conventional weighting materials to form a high density solution which will drop through a water zone for injection at a particular point or will drop downwardly through a water containing thief zone or other porous formation. The formation of high density fluids and materials for inclusion in such fluids is well known in petroleum production technology. Any loading material which is non-reactive with the polymer or which has a known rate of reaction with the polymer may be utilized.

One of the important characteristics of the process and materials is that the Thief Kill polymer is nonadhesive to silicates and, therefore, does not bond directly to the sand. This is extremely important in one aspect of the invention.

Unlike most other plugging concepts and systems, the process of this invention results in a permanent, totally impermeable plug of the formation. In some instances, it may be desirable to fracture the plug, to use a hitherto producing oil well as an injection well, for example, or for other reasons. If the polymer used to form the permanent plug were adhesive to silicate surfaces so as to form a solid polymer-sand bonded system, it would be virtually impossible ever to fracture the system and to permit return of fluid flow through the once plugged formation. Thief Kill is not, however, adhesive to the silicate surface of sands and, therefore, forms a plug structure which can be fractured. The permanency and the complete repair of the failure of the oil well conduit for complete plugging of the Thief Kill as the case may be results from the formation of a polymer system which includes all of the water residual in the plugging zone of the formation. The plug, therefore, does not merely inhibit or reduce flow of liquids through the plugging formation, it incorporates all water in the plugging formation and absolutely closes the formation to liquid flow.

Figure 4:
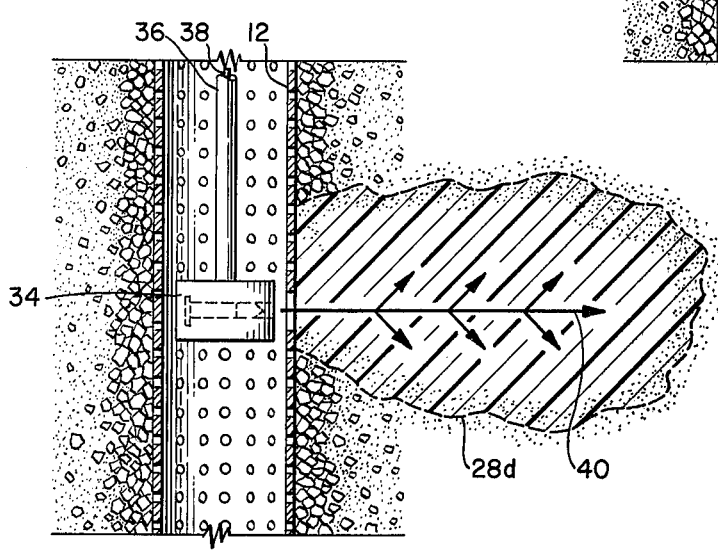
FIG. 4 is a simplified schematic view of a section of the screen pipe of an oil well illustrating the method and means for breaking up a previously plugged zone adjacent the screen pipe.

One method for fracturing the plugging zone of the formation is depicted schematically in FIG. 4. The permanently plugged zone is indicated at 28d adjacent the screen pipe 12. If it becomes necessary or desirable to open up this zone or permeation again, a gun perforator indicated generally at 34 supported by a rod or any other desired support means 36 and connected by means of electrical conduits 38 to an external source of detonating power is lowered into position adjacent the plugged zone. In the normal case, the plugged zone can be located from the oil well log record which will show the time and placement of the plug. If the location of the plug is not known, it can be determined by isolating the zone using a pair of bridge plugs and moving the bridge plugs until a zone of no-flow is located. Gun perforators are well-known in petroleum production technology and are commonly used for perforating the wall of a pipe once the well casing in is place and the oil producing formation has been identified and located. Basically, the gun perforator comprises a chamber which is loaded with an explosive and a projectile. The explosive charge may be detonated from the surface propelling the projectile laterally through the wall of the casing or screen pipe and into the formation. In most instances, the force of the projectile alone will not sufficiently rupture the plugged zone to permit adeuqate fluid injection. Rather, the projectile causes a fracture pattern indicated generally at 40 in FIG. 4 in the plug zone. Fluid under extremely high pressure is then injected into the fracture zone created by the projectile resulting in more complete hydraulic fracturing of the formation. This hydraulic fracturing of the formation is possible only because the plugging polymer, Thief Kill, does not bond to the silicate surfaces of the sand. If such a bond were formed, the formation would be so rigid and have such great strength as to preclude hydraulic fracturing as a practical approach to opening up a hitherto plugged formation.

The plugging polymer system, Thief Kill, is formulated from polyphenolic - paraformaldehyde blended resin to which sodium silicate is added as a polymerization accelerator and/or sodium hydroxide is added as a polymerization inhibitor. By blending according to the principals set forth hereinafter, Thief Kill can be formulated.

Thief Kill is a product distributed by Diversified Chemicals Corporation identified as DICHEM 1260-Thief Kill. Thief Kill is an aqueous solution of pre-catalyzed polyphenolparaformaldehyde designed to totally seal off undesirable formations. Thief Kill is injected as an aqueous solution, and is catalyzed to form a rigid, impermeable jell in a controlled set time of approximately two hours. The set time can be varied according to principles set forth hereinafter. The polymer formed is highly effective in plugging thief zones of water injection wells, high water entry zones of producing wells and thief wells in steam injection wells. Thief Kill is also effective as a means of sand consolidation in damaged wells producing formation sand.

Polyphenols suitable for use in this invention are extracted from the bark of various trees and may be prepared by conventional polymerization methods. Phenolic resins in general are described by W. A. Keutgen, "Phenolic Resins", Kirk-Othmer Encyclopedia of Chemical Technology, 2nd Ed., Vol. 15, pp. 176-208, and in literature cited therein, e.g., P. Robitschek and A. Lewin, *Pehnolic Resins,* Iliff and Sons Ltd., London 1950; R. W. Martin, *The Chemistry of Phenolic Resins,* John Wiley and Sons, Inc., New York, 1956; N. J. L. Megson, *Phenolic Resin Chemistry,* Academic Prews, Inc., New York, 1959; D. F. Gould, *Phenolic Resins,* Reinhold Publishing Corp., New York, 1959. Polyphenolparaformaldehyde blended resins are known and commercially available. One such blended resin is Borden "Geoseal" MP-1, a dry blended phenol-paraformaldehyde resin product. The plugging composition used in this invention may be formulated from any of several available polyphenol-paraformaldehyde blends or starting with polyphenol resin extract directly. Techniques of formulation are conventional and no novelty as to the class of resins or the method of formulation is involved. Once the characteristics are defined, it is well within the skill of the art to provide a resin system which will meet the defined characteristics.

The plugging compositions of this invention are characterized as follows:

(a) They consist essentially of polyphenol resin extract from natural sources such as bark or equivalent synthesized resin blended with paraformaldehyde.

(b) The resin blend is completely soluble in water when mixed with sodium hydroxide in a 1:10 weight ratio of sodium hydroxide to resin.

(c) The dissolved resin is stable at room temperature for a period long enough to permit handling and polymerizes in situ in from about one-half hour to about 10 hours to form a gel which includes without substantial weepage all of the water of the solution.

(d) The gel resulting from polymerization is nonadherent to silicate surfaces; i.e., it does not form a bond of significant strength to the surface of sand and gravel in an oil well formation. This characteristic is inherent from the use of polyphenolic-paraformaldehyde blended resins.

Again, using Thief Kill as exemplary of the resins which may be used in this invention, formulation techniques are known. For example, it is known that additional sodium hydroxide lengthens the gel time. This slowing reaction can be used to control the gel time of the Thief Kill. The gel time of Thief Kill can be reduced by adding sodium silicate solution. Accordingly, by appropriate additions of sodium hydroxide or sodium silicate, considerable variation for gel time of Thief Kill can be obtained. Sodium hydroxide may, additionally, be used to offset an over addition of sodium silicate and, vice versa, sodium silicate addition may be used to overcome an over addition of sodium hydroxide.

Calcium and magnesium ions, and all divalent ions, tend to accelerate the rate of gel formation of Thief Kill. Large quantities of monovalent ions also accelerate the gel time of Thief Kill and tend to make stronger gels.

Thief Kill can be loaded up with a conventional high density weighting composition where it is necessary to drop the Thief Kill through a water zone.

Gel characteristics can be modified by the inclusion or exclusion of various of the salts, as discussed above, and also by the concentration of the phenol formaldehyde resin. For example, a ten weight percent concentration of resin in water yields a soft, impermeable gel. In cases where there is a high pressure differential, for example, in an injection well, concentrations as high as 15 to 25% resin may be desirable to produce a stiff, hard impermeable gel. In either case, the gels set up to incorporate all of the water in the zone with little or no weapage. It is significant that the gel is non-adhesive to silicate and, therefore, doe not adhere to the sand to form a hard, impenetratable block. This characteristic permits the fracturing of the structure with a small fraction of the energy which would be required if the resin were adhesive to sand incorporated in the gel structure.

In certain instances, for example, where high temperatures and high pressures are encountered, up to 35 weight percent resin in aqueous solution is desirable to provide a highly thermal and pressure resistant impermeable gel structure.

Sodium silicate, as an accelerator, may be added, typically, in the range of from one part sodium silicate to 200 parts resin, more typically in a 1:20 ratio of sodium silicate to resin and, in some instances, in a 1:7 ratio of sodium silicate to resin. Gel time and gel structure can easily be determined by routine laboratory tests forming the gel under simulated conditions of temperature and pressure.

The Thief Kill plugging process described and claimed herein has been tested in the field. For example, in one test example, Thief Kill was injected into a producing oil well which had begun filling with sand through a corrosion initiated perforation at about 3056 feet. After plugging the screen pipe above and below the located perforation, 20 barrels of Thief Kill, 1:10 sodium hydroxide ratio, 10% solution was pumped into the well and forced into the sand producing zone adjacent the perforation followed by 36 barrels of water. The zone was maintained in a hydrostatically quiet condition for two hours to permit the Thief Kill to set and was then pressure tested at 500 PSI. Following other repairs to the equipment, the well was placed back in production. Initial production of the well, before the rupture, was 50 barrels per day. Immediately following restoration of production, the well was producing 24 barrels per day and has gradually returned to approximately its original, pre-repair, rate of production.

The foregoing description, and particularly the schematic diagrams used as an aid in explaining the process and concepts of the invention, are merely exemplary of various ways of carrying out the invention and are not limiting but rather are intended only as aid to understanding. Accordingly, the scope of the invention is intended to be limited only by the concept of the invention and the following claims.

We claim:

1. As a method for restoring to production oil wells in which production has been impaired by the rupture of a perforated liner and intrusion through the rupture of sand from the adjacent formation into the well, the steps comprising:
   (a) isolating from the rest of the well the section of the liner which includes the rupture to permit selective pumping of liquid to the rupture zone of the well;
   (b) determining the rate of flow at a predetermined pressure of water through the perforation to thereby predetermine a volume for a plug zone in the formation adjacent the rupture zone;
   (c) pumping a plugging solution into the rupture zone at a predetermined rate for a predetermined time to result in said predetermined plug zone volume, said plugging solution containing precatalyzed resin which sets in a time period of from about one-half to about ten hours to a water impermeable gel which incorporates without substantial weapage the water in the plug zone and which is not adherent to silicate surfaces;
   (d) pumping water into the rupture zone at a predetermined rate for a predetermined time to force the plugging solution out of the well and into a plug zone of said predetermined volume in the sand formation adjacent the rupture zone to thereby form upon the setting of the resin a water impermeable plug to thereby permanently prevent intrusion of sand through the rupture into the well; and
   (e) holding by adjusting the pressure of the water the resin containing solution static in the plug zone for from about one-half to ten hours until the resin sets to form an impermeable plug.

2. In the process of claim 1 the additional steps of:
   (f) pumping water to the plugged puncture zone and establishing a new flow rate at a predetermined pressure following the previous plugging operation; and
   (g) repeating step (b) through (e) one or more times to further plug the formation adjacent the puncture zone to complete the repair of the well casing.

3. The method of claim 2 wherein the plugging solution is an aqueous solution of pre-catalyzed polyphenol-paraformaldehyde resin and sodium hydroxide in a ratio of about 1 part of sodium hydroxide to about 10 parts of resin.

4. The method of claim 3 wherein the solution also includes sodium silicate in the ratio of from about 1 part of sodium silicate to from about 7 to about 20 parts of resin.

5. In the process of claim 4 the additional steps of:
   (f) pumping water to the plugged thief zone at a predetermined pressure following the previous plugging operation; and
   (g) repeating steps (b) through (e) one or more times to further plug the thief zone.

6. The method of claim 5 wherein the plugging solution is an aqueous solution of pre-catalyzed polyphenol-paraformaldehyde resin and sodium hydroxide in a ratio of about 1 part of sodium hydroxide to about 10 parts of resin.

7. The method of claim 6 wherein the solution also includes sodium silicate in the ratio of from about 1 part of sodium silicate to from about 7 to about 20 parts of resin.

8. The method of claim 7 wherein the solution also includes sodium silicate in the ratio of from about 1 part of sodium silicate to from about 7 to about 20 parts of resin.

9. The method of claim 1 wherein the plugging solution is an aqueous solution of pre-catalyzed polyphenol-paraformaldehyde resin and sodium hydroxide in a ratio of about 1 part of sodium hydroxide to about 10 parts of resin.

10. The method of claim 9 wherein the solution also includes sodium silicate in the ratio of from about 1 part of sodium silicate to from about 7 to about 20 parts of resin.

11. As a method for improving the effectiveness of an injection well by plugging off thief zones, the steps of:
    (a) isolating from the rest of the well the section of the liner through which liquid flows most rapidly into a thief zone to permit selective pumping of liquid to the isolated thief zone;
    (b) establishing the flow rate take-up capacity of the thief zone at a predetermined liquid pressure to thereby predetermine a volume for a plug zone in the thief zone formation adjacent the casing;
    (c) pumping a plugging solution into the isolated section of the well liner at said predetermined pressure and flow rate for a predetermined time to result in said predetermined plug zone volume, said plugging solution containing precatalyzed resin which sets in a time period of from about one-half to about ten hours to a water impermeable gel which incorporated without substantial weepage the water in the plug zone and which is not adherent to silicate surfaces;
    (d) pumping water into the isolated section of the well at a predetermined rate for a predetermined time to force the plugging solution out of the well and into a plug zone of said predetermined volume in the sand formation in the thief zone adjacent the isolated section of liner to thereby form upon the setting of the resin a water impermeable plug to thereby permanently plug said thief zone; and
    (e) holding by adjusting the pressure of the water the resin containing solution static in the plug zone for from about one-half to about ten hours until the resin sets to form an impermeable, permanent plug.

12. The method of claim 11 wherein the plugging solution is an aqueous solution of pre-catalyzed polyphenol-paraformaldehyde resin and sodium hydroxide in a ratio of about 1 part of sodium hydroxide to about 10 parts of resin.

13. As a method for increasing the petroleum production of an oil well wherein massive water from a water producing zone impairs the production of petroleum, the steps of:
    (a) isolating from the rest of the well the section of the section of the liner which is adjacent the water producing zone to permit selective pumping of liquid to said zone;
    (b) determining the rate of flow at a predetermined pressure of water into said zone to thereby predetermine a volume for a plug zone in the formation of the water producing zone adjacent said liner section;
    (c) pumping a plugging solution into the isolated liner section at a predetermined rate for a predetermined time to result in said predetermined plug zone volume, said plugging solution containing precatalyzed resin which sets in a time period of from about one-half to about ten hours to a water impermeable gel which incorporates without substantial weepage the water in the plug zone and which is not adherent to silicate surfaces;
    (d) pumping water into said isolated liner section at a predetermined rate for a predetermined time to force the plugging solution out of the well and into a plug zone of said predetermined volume in the sand formation adjacent said liner section to thereby form upon the setting of the resin a water impermeable plug to thereby permanently prevent intrusion of water into the well; and
    (e) holding by adjusting the pressure of the water the resin containing solution static in the plug zone for from about one-half to ten hours until the resin sets to form an impermeable plug.

14. In the process of claim 13 the additional steps of:
    (f) pumping water to the isolated liner section and establishing a new flow rate at a predetermined pressure following the previous plugging operation; and
    (g) repeating steps (b) through (e) one or more times to further plug water producing zone formation adjacent the isolated liner section.

15. The method of claim 14 wherein the plugging solution is an aqueous solution of pre-catalyzed polyphenol-paraformaldehyde resin and sodium hydroxide in a ratio of about 1 part of sodium hydroxide to about 10 parts of resin.

16. The method of claim 15 wherein the solution also includes sodium silicate in the ratio of from about 1 part of sodium silicate to from about 7 to about 20 parts of resin.

17. The method of claim 13 wherein the plugging solution is an aqueous solution of pre-catalyzed polyphenol-paraformaldehyde resin and sodium hydroxide in a ratio of about 1 part of sodium hydroxide to about 10 parts of resin.

18. The method of claim 17 wherein the solution also includes sodium silicate in the ratio of from about 1 part of sodium silicate to from about 7 to about 20 parts of resin.

19. The method of plugging and thereafter opening a formation comprising the steps of:
    (a) pumping into a porous sand formation adjacent an oil well a plugging solution which contains precatalyzed resin which sets to a water impermeable gel which is not adherent to silicate surfaces;
    (b) holding the resin containing solution static in the plug zone until the resin sets to form an impermeable permanent plug which is not adherent to silicate surfaces; and
    (c) thereafter propelling a projectile into the plug zone thereby fracturing the resin gel to permit permeation of the zone by liquid.

20. The method of claim 19 wherein the plugging solution is an aqueous solution of pre-catalyzed polyphenol-paraformaldehyde resin and sodium hydroxide in a ratio of about 1 part of sodium hydroxide to about 10 parts of resin.

* * * * *